United States Patent
Eigemann et al.

(10) Patent No.: US 8,433,729 B2
(45) Date of Patent: Apr. 30, 2013

(54) METHOD AND SYSTEM FOR AUTOMATICALLY GENERATING A COMMUNICATION INTERFACE

(75) Inventors: Sven-Eric Eigemann, Sandhausen (DE); Matthias Geiger, Mannheim (DE); Patrick Zimmer, Walldorf (DE)

(73) Assignee: SAP AG, Walldorf (DE)

( * ) Notice: Subject to any disclaimer, the term of this patent is extended or adjusted under 35 U.S.C. 154(b) by 63 days.

(21) Appl. No.: 11/540,806

(22) Filed: Sep. 29, 2006

(65) Prior Publication Data

US 2008/0082535 A1 Apr. 3, 2008

(51) Int. Cl.
*G06F 7/00* (2006.01)
(52) U.S. Cl.
USPC .......................................... 707/796; 707/803
(58) Field of Classification Search .................. 707/100, 707/102, 104.1, 796, 803
See application file for complete search history.

(56) References Cited

U.S. PATENT DOCUMENTS

| | | | | |
|---|---|---|---|---|
| 6,574,655 B1 * | 6/2003 | Libert et al. | ................... | 709/200 |
| 6,718,535 B1 * | 4/2004 | Underwood | ................... | 717/101 |
| 7,100,195 B1 * | 8/2006 | Underwood | ...................... | 726/2 |
| 7,185,075 B1 * | 2/2007 | Mishra et al. | ................... | 709/223 |
| 7,212,574 B2 * | 5/2007 | Abrams et al. | ........... | 375/240.25 |
| 7,225,249 B1 * | 5/2007 | Barry et al. | ..................... | 709/227 |
| 7,587,412 B2 * | 9/2009 | Weyl et al. | ............................. | 1/1 |
| 7,822,635 B1 * | 10/2010 | Brown et al. | ................ | 705/14.1 |
| 2003/0208638 A1 * | 11/2003 | Abrams et al. | ................ | 709/328 |
| 2004/0176958 A1 * | 9/2004 | Salmenkaita et al. | ........ | 704/275 |
| 2006/0074735 A1 * | 4/2006 | Shukla et al. | ...................... | 705/8 |
| 2006/0200739 A1 * | 9/2006 | Bhatia et al. | .................. | 715/500 |
| 2006/0218204 A1 * | 9/2006 | Ofer et al. | ...................... | 707/201 |
| 2007/0016557 A1 * | 1/2007 | Moore et al. | ....................... | 707/3 |
| 2007/0050341 A1 * | 3/2007 | Hull et al. | .......................... | 707/3 |
| 2007/0053513 A1 * | 3/2007 | Hoffberg | ........................ | 380/201 |
| 2007/0133874 A1 * | 6/2007 | Bressan et al. | ................ | 382/181 |
| 2007/0244910 A1 * | 10/2007 | Mital et al. | ..................... | 707/100 |
| 2007/0260629 A1 * | 11/2007 | Tseitlin et al. | ................ | 707/102 |
| 2008/0065616 A1 * | 3/2008 | Brown | .............................. | 707/4 |
| 2009/0030771 A1 * | 1/2009 | Eder | ............................... | 705/10 |

* cited by examiner

*Primary Examiner* — James Trujillo
*Assistant Examiner* — Linh Black
(74) *Attorney, Agent, or Firm* — Kenyon & Kenyon LLP

(57) ABSTRACT

A method includes determining, by a conversion tool, at least one specific data associated with an interface of a service of a first application, the determining comprising retrieving metadata associated with the service of the first application, the metadata describing the specific data; and automatically generating, by the conversion tool, a data context for use in requesting the service from the first application, the data context comprising at least one data field for storing the at least one specific data associated with the interface of the service.

14 Claims, 4 Drawing Sheets

METHOD AND SYSTEM FOR AUTOMATICALLY GENERATING A COMMUNICATION INTERFACE

BACKGROUND INFORMATION

Services provided by a computing system may include any type of functionality provided by the system and may be implemented at least in part by software applications of the system. For example, a particular service may include a business functionality and may be implemented by an application which includes business logic to perform the business functionality. Generally speaking, legacy applications exist which have become outdated in some aspect, but which may still implement services which remain useful. For example, the user interface of a legacy application may have become outdated, but the service it implements may still be useful. One approach to using the services of legacy applications includes developing a new application which reuses the services of the legacy application but which updates the outdated aspects.

One problem associated with this approach is that it may be difficult to create the communication interface between the new application and the legacy application. The communication interface between the new application and the legacy application typically includes an interface component of the new application and an interface component of the legacy application. The interface component of the legacy application may include a plurality of separate interfaces, each interface associated with a particular service of the legacy application. Moreover, all or some of the plurality of interfaces of the services of the legacy application may be unique to that service. The interface component of the new application may therefore require a plurality of different interfaces to interface with the plurality of interfaces of the legacy application, or at least an interface component which is capable of correctly interfacing with each of the plurality of interfaces of the plurality of services of the legacy application. Furthermore, there may be a large number of services provided by the legacy application. Therefore, it may be undesirably time-consuming and cumbersome to a developer of the new application to implement the interface component of the new application to accommodate all of the services of the legacy application.

BRIEF DESCRIPTION OF THE DRAWINGS

So that features of the present invention can be understood in detail, a description of the invention can be had by reference to embodiments, some of which are illustrated in the appended drawings. It is to be noted, however, that the appended drawings illustrate only particular embodiments and are therefore not to be considered limiting of scope, for the invention may admit to other equally effective embodiments.

DETAILED DESCRIPTION

Embodiments are related to automatically generating elements of a communication interface between software components. In one embodiment, a conversion tool automatically generates a data context for a communication interface between a software component being developed and an existing software component.

Figure 1:
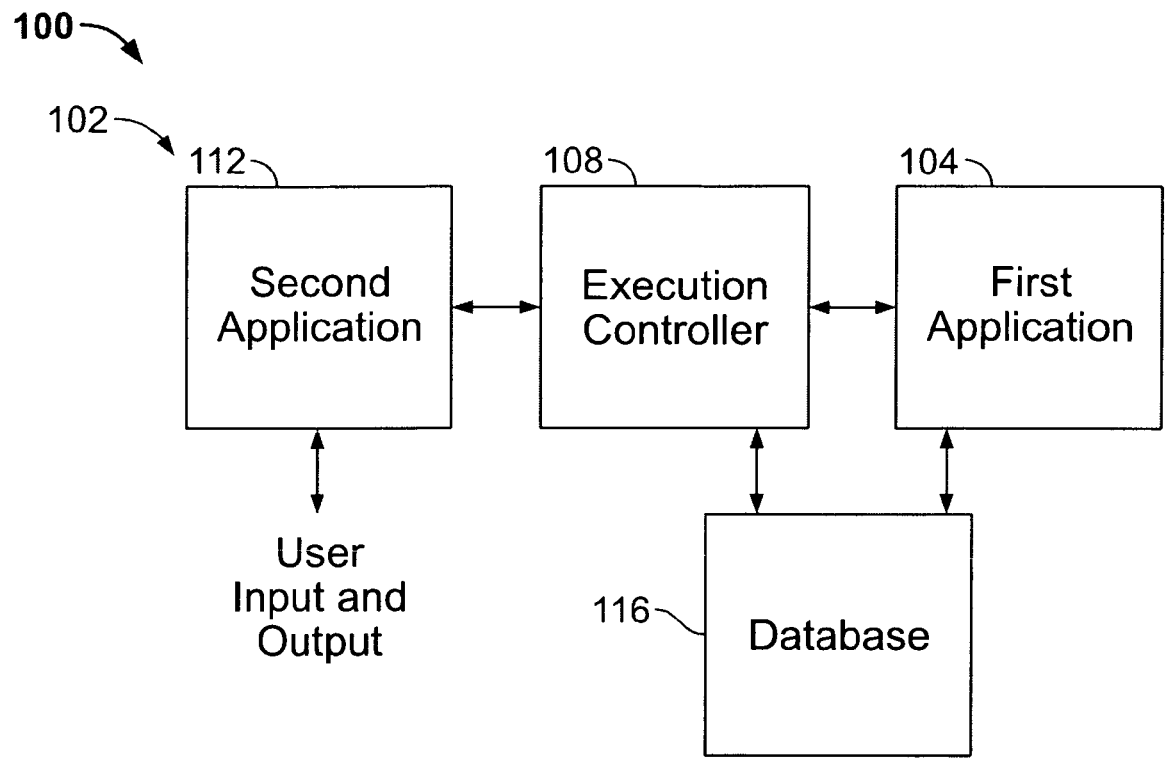
FIG. 1 is a schematic diagram depicting one embodiment of a first software architecture.

FIG. 1 depicts one embodiment of a first software architecture 100. The depicted exemplary embodiment of the first software architecture 100 comprises a plurality of software components 102, including a first application 104, an execution controller 108, and a second application 112. The first application 104 is capable of performing a service. In one embodiment, the first software architecture 100 includes a database 116, and the performing of the service by the first application 104 includes accessing the database 116. The second application 112 is capable of receiving an input from a user, and communicating with the execution controller 108. The execution controller 108 is capable of communicating with both the first application 104 and the second application 112. In one embodiment, the execution controller 108 is also capable of accessing the database 116. Other embodiments of the first software architecture 100 also exist.

In an exemplary scenario, the first application 104 is a relatively older application, i.e., a legacy application, and the second application 112 is a relatively newer application. For example, the second application 112 can be developed to update some undesirable or outmoded aspect of the first application 104. In one embodiment, the second application 112 provides a user interface that is updated relative to a user interface of the first application 104.

An exemplary use of the first software architecture 100 proceeds as follows. The user provides input to the second application 112, optionally comprising providing input to the graphical user interface of the second application 112. The second application 112 then invokes a service from the first application 104 through the execution controller 108, the service being related to the received user input. The execution controller 108, in response to the invoking of the service by the second application 112, requests the service from the first application 104. As part of the service request, the execution controller provides any data required for the service to the first application 104. The data provided by the execution controller 108 to the first application 104 optionally comprises at least one of: the input data received by the second application 112, or data associated with the input data received by the second application 112. The second application 112 provides the received input data, or the data related to the received input data, to the execution controller 108. The first application 104, in response to the service request by the execution controller 108, performs the requested service, and returns any output data to the execution controller 108. The execution controller 108 then communicates the result of the service, optionally including the output data, to the second application 112. Typically, this results in an updating of the view shown by the graphical user interface of the second application 112.

In one embodiment, the first software architecture 100 depicted in FIG. 1 corresponds to the software architecture described in U.S. patent application Ser. No. 11/441,463, to Stefan Elfner et al., filed Apr. 25, 2006, entitled "Mapping a New User Interface onto an Existing User Interface," which is hereby incorporated by reference in its entirety.

Figure 2:
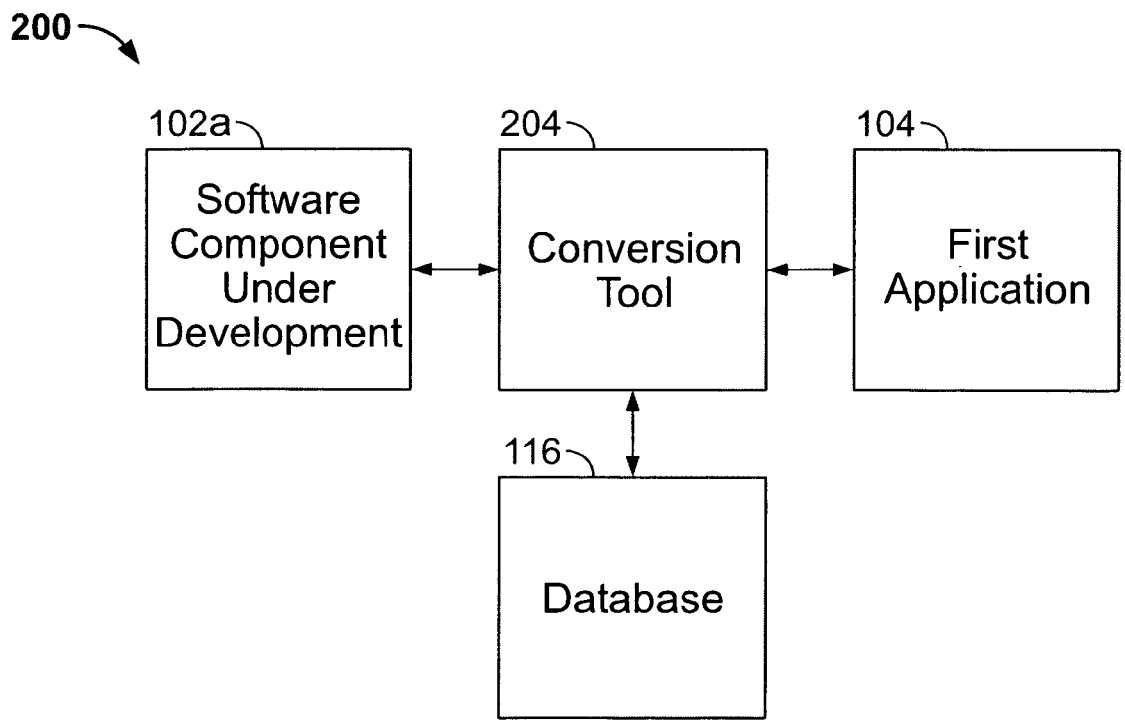
FIG. 2 is a schematic diagram depicting one embodiment of a second software architecture.

FIG. 2 depicts one embodiment of a second software architecture 200 comprising a software component 102a under development, a conversion tool 204, and the database 116. The software component 102a under development is a particular software component 102 which is being created by a developer. The software component 102a may be in various stages of development, but has not been fully developed. In one embodiment, the software component 102a still lacks a fully developed capability for communicating with at least some other software component 102 for which it is desirable that the software component 102a communicate. In one embodiment, the software component 102a under development comprises at least one of: the execution controller 108 or the second application 112. In one embodiment, the execution controller 108 and the second application 112 can be developed simultaneously, and together be regarded as the software component 102a under development. The conversion tool 204 is capable of interfacing with both the software component 102a and the database 116. In one embodiment, the conversion tool 204 is also capable of interfacing with the first application 104.

Figure 3:
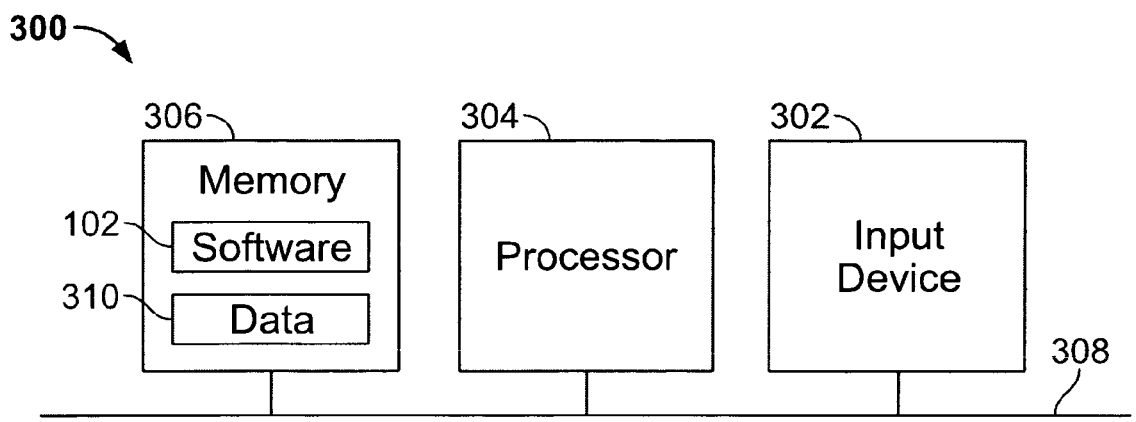
FIG. 3 is a schematic diagram depicting one embodiment of a computing environment.

The first and second software architectures 100, 200 depicted in FIGS. 1 and 2 run in, and are part of, a computing environment 300, an exemplary embodiment of which is depicted in FIG. 3. The computing environment 300 comprises an input device 302, a processor 304, a memory 306 and a communication line 308. The memory 306 further comprises data 310 and the various software components 102, which are stored in the memory 306 at least at some moment in time. The input device 302 optionally comprises at least one of: a keyboard, a mouse, a voice activated controller, an optical controller, an infrared controller, or other suitable input device. The memory 306 optionally comprises at least one of: a random access memory, a disk storage memory, or other suitable memory. The software components 102 comprise computer program instructions which may be accessed and executed by the processor 304. The software components 102 are implemented in any suitable software language such as, for example, lava, ABAP, C, C++, etc. The data 310 optionally comprises data which is accessible by or integral to the database 116.

The memory 306, processor 304 and input device 302 are connected together, and communicate with each other, by means of the communication line 308. In one embodiment, the communication line 308 comprises a system bus, and the computing environment 300 comprises a single computer. In another embodiment, the communication line 308 comprises a network element, and the computing environment 300 comprises a distributed computing environment. In one embodiment in which the computing environment 300 is distributed, the memory 306, processor 304 and input device 302 are optionally distributed across different locations. In one embodiment in which the computing environment 300 is distributed, the computing environment 300 optionally comprises a plurality of some or all of the memory 306, the processor 304 and the input device 302. Other configurations of the computing environment 300 are also possible.

Figure 4:
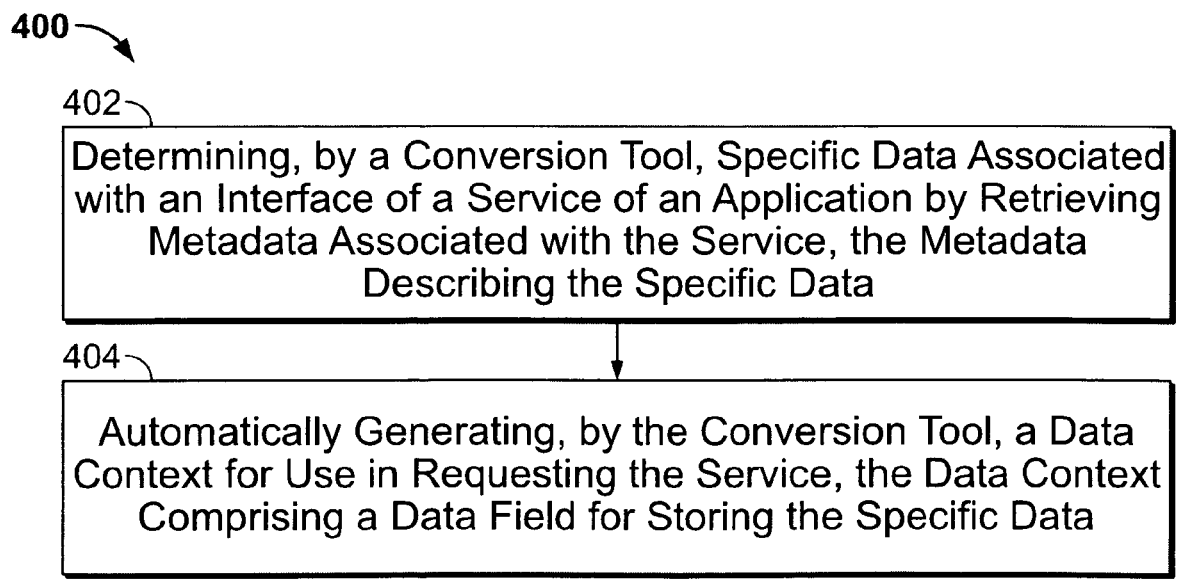
FIG. 4 is a flow chart depicting a schematic representation of one embodiment of a method.

The conversion tool 204 comprises computer program instructions, which when executed by the processor 304, enable the performance of a method 400 (shown in FIG. 4). For example, the computer program instructions of the conversion tool 204 enable the automatic generation of elements of a communication interface between software components 102. In one embodiment, the computer program instructions of the conversion tool 204 enable the automatic generation of a data context 604 (shown in FIG. 6) for a communication interface between the software component 102a being developed and an existing software component 102, e.g., the first application 104. In one embodiment, the conversion tool 204 comprises computer program instructions, which when executed by the processor 304, receive input from a user such as a human operator, and enable the automatic generation of the elements of the communication interface 602 (shown in FIG. 6) including the data context 604. For example, the computer program instructions of the conversion tool 204 optionally provide a human operator with the ability to manage and provide input to the performance of the method 400. In one embodiment, the computer program instructions of the conversion tool 204, in combination with the computer program instructions of some or all of the other software components 102, enable the performance of the method 400. In one embodiment, a computer readable medium comprises the computer program instructions which enable the performance of the method 400. In one embodiment, a system comprises means to perform each of the steps of the method 400. For example, in one embodiment, the means to perform each of the steps of the method 400 comprise elements of the computing environment 300.

Figure 5:
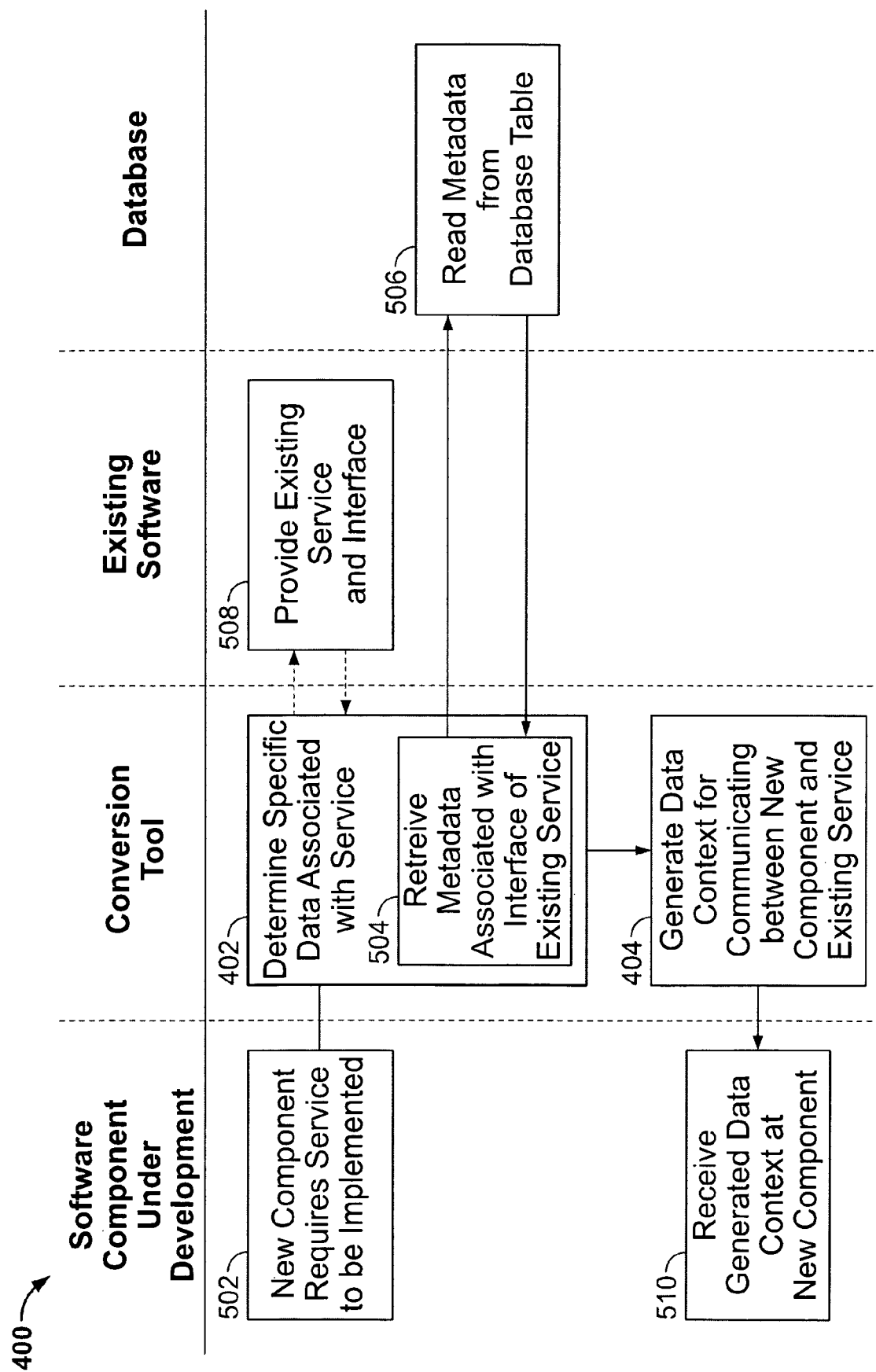
FIG. 5 is a flow diagram depicting another schematic representation of one embodiment of the method depicted in FIG. 4.

FIG. 4 depicts a schematic representation of one embodiment of the method 400. The method 400 of FIG. 4 is merely one way of carrying out the various embodiments described herein, since variations of the embodiment of the method 400 depicted in FIG. 4 are possible. Additionally, FIG. 5 depicts another schematic representation of one embodiment of the method 400 depicted in FIG. 4. The schematic representation FIG. 5 may be useful to further understand embodiments of the method 400 depicted in FIG. 4, and contains additional visual elements, such as visually organizing the steps of the method 400, as discussed below, according to their correspondence to software components 102 of the first and second software architectures 100, 200. The embodiment of the method 400 depicted in FIG. 5 may overlap parts of the embodiment of the method 400 depicted in FIG. 4, and provide additional steps which are part of the embodiment depicted in FIG. 5.

Figure 6:
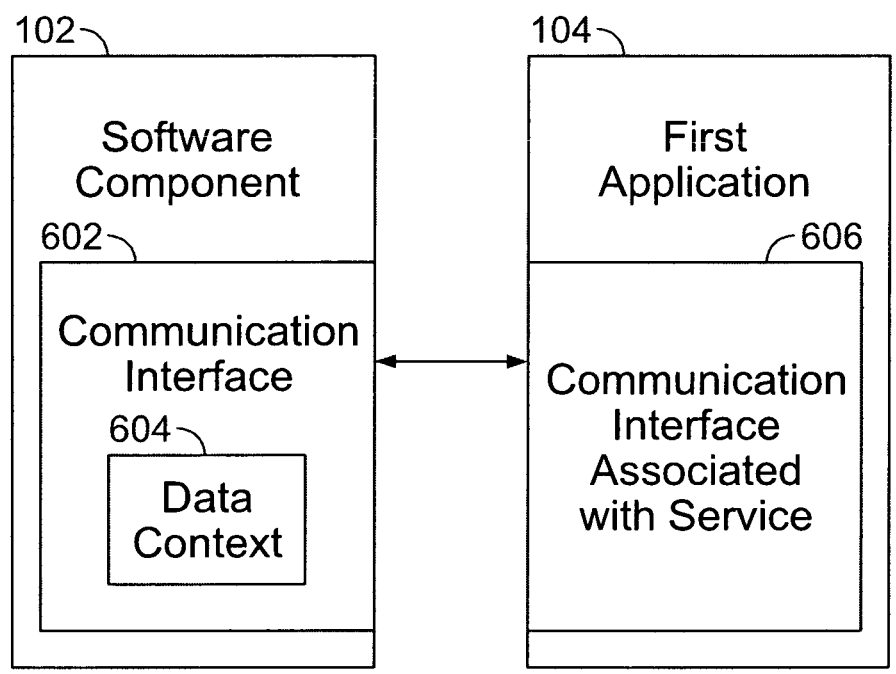
FIG. 6 is a schematic diagram depicting one embodiment of communication interfaces of software components of the first and second software architectures.

In one embodiment, as depicted in FIG. 4, the method 400 begins at step 402. At step 402, the conversion tool 204 determines specific data which is associated with the interface 606 (shown in FIG. 6) of the service of the first application 104. FIG. 6 depicts schematically one embodiment of portions of the software component 102 and the first application 104 involved in communication between each other. The service of the first application 104 comprises the communication interface 606 which receives any data required to perform the service, and outputs any data which is the result of the performance of the service. The communication interface 606 is part of the first application 104, and is the particular interface 606 the first application 104 presents in association with a particular service. The first application 104 may have a plurality of different communication interfaces 606 associated with a plurality of different services. In the embodiment depicted in FIG. 6, the software component 102 also comprises a communication interface 602 which is capable of communicating with the communication interface 606 of the service of the first application 104.

In one embodiment, the communication interface 606, associated with the service of the first application 104, comprises a graphical user interface. In one such embodiment in which the communication interface 606 comprises a graphical user interface, the determining of step 402 comprises determining specific data which is associated with the graphical user interface of the communication interface 606.

In the first software architecture 100 depicted in FIG. 1, the communication interface 606 of the service of first application 104 is accessed by the corresponding communication interface 602 of the execution controller 108. In such an embodiment, the communication interface 602 of the execution controller 108 provides any data needed to the communication interface 606 of the service of the first application 104, and receives any data output by the communication interface 606 associated with the service.

In one embodiment, the determining at step 402 determines at least one specific data associated with the service of the first application 104. The term 'specific data' is includes a data variable or data constant that is passed to or received from the communication interface 606 of the service. The specific data may have a value which is variable, as in the case of a data variable, or which is fixed, as in the case of a data constant. A reference to the value of the specific data will include the term 'value'. The term 'specific data' refers to either a single piece of data or a plurality of pieces of data, unless the term is modified in such a way as to specifically refer to the singular or the plural. For example, the term 'at least one specific data' refers to at least one specific piece of data, and the term 'a plurality of specific data' refers to a plurality of specific pieces of data.

The specific data may comprises data of various different data types. In one embodiment, the specific data comprises at least one of the following data types: a character data type, an integer data type, a floating-point number data type, a fixed-point number data type, a boolean data type, a string data type, or an object data type.

In one embodiment, the determining comprises a step 504 of retrieving metadata associated with the service of the first application 104. In one embodiment, at least one metadata is retrieved which provides the identity of the at least one specific data associated with the service. The metadata describes the specific data associated with the interface 606 of the service of the first application 104. The term 'metadata' refers to either a single piece of metadata or a plurality of pieces of metadata, unless the term is modified in such a way as to specifically refer to the singular or the plural. For example, the term 'at least one metadata' refers to at least one piece of metadata, and the term 'a plurality of metadata' refers to a plurality of pieces of metadata.

In one embodiment in which the communication interface 606 comprises a graphical user interface, the retrieving of step 504 comprises retrieving metadata which is associated with the graphical user interface of the communication interface 606 of the service of the first application 104.

In one embodiment, the metadata does not include the specific data itself, and instead is any data that provides an indication as to what the specific data is. In the case in which the metadata does not include the specific data, the metadata may directly describe the specific data associated with the service. For example, the metadata may directly describe the specific data by comprising a name of the specific data. In the case in which the metadata does not include the specific data, the metadata may also indirectly describe the specific data associated with the service. For example, the metadata may provide a clue that is interpreted by the conversion tool 204 to ascertain the identity of the specific data, the interpreting possibly including processing of the metadata by the conversion tool 204.

In one embodiment, the metadata may include portions of the specific data, or exemplary values of the specific data. In such an embodiment, the metadata may include a previous value of the specific data associated with a previous performance of the service. For example, the conversion tool 204 can optionally recognize exemplary values of the specific data and determine the identity of the specific data therefrom.

In one embodiment, the retrieving at step 504 comprises a step 506 of reading the metadata from a table of the database 116. For example, the table is optionally associated with the service in the database 116. In one embodiment, the performance of the service by the first application 104 includes at least one of: communicating with the database 116, reading data from the database 116, writing data to the database 116, or processing data associated with the database 116. The performing of the service may therefore leave clues in the database 116 as to the identity of the specific data required by the communication interface 606 associated with the service, for example in at least one table of the database 116. These clues, i.e. the metadata, can be retrieved by the conversion tool 204 to determine the specific data. In one embodiment, the metadata read from the database table includes at least one of: a key of the table, a primary key of the table, a column heading of the table, or a data element stored in the table. In one embodiment, the retrieving the metadata comprises reading the metadata from a plurality of database tables associated with the service. In one embodiment, the conversion tool 204 retrieves the metadata from a record or log of previous performances of the service. Such a record or log can optionally be part of the a database table of the database 116.

In one embodiment, the retrieving comprises searching the database 116 for the metadata. For example, the service is optionally associated with at least one of: a service name, or a command name of a command of the first application 104 which is part of the service; and in one such embodiment the method 400 comprises searching the database 116 for a specific database table having at least one of: the service name, or the command name.

In one embodiment, the retrieving at step 504 comprises retrieving the metadata from within computer program instructions. For example, the metadata may be embedded within the computer program instructions of the first application 104, and the conversion tool 204 is optionally capable of analyzing the computer program instructions of the first application 104 to locate and retrieve the metadata. The conversion tool 204 may use a search engine or a text parser to locate and retrieve the metadata from within the computer program instructions. The conversion tool 204 is also optionally capable of retrieving the metadata from within software other than the first application 104. For example, another piece of software may be associated with the service of the first application 104, but may have better clues, i.e., more readily accessible metadata, concerning the specific data associated with the interface 606 of the service than the computer program instructions of the first application 104 itself.

In one embodiment, the metadata describes at least one of: a first at least one specific data required by the interface 606 of the service first application 104 when the service is requested, or a second at least one specific data returned by the interface 606 of the service of the first application 104 after the service is performed.

In one embodiment of the method 400, as depicted in FIG. 4, step 404 is performed after step 402. At step 404, the conversion tool 204 automatically generates at least a portion of the communication interface 602 of the software component 102a under development, the portion for use in requesting the service from the first application 104. The automatic generation is based on the determined at least one specific data. In one embodiment, the portion of the communication interface 602 automatically generated for the software component 102a comprises a data context 604. The data context 604 is a data container that holds the values of the specific data determined to be associated with the service. The data context 604 is generated to be part of the software component 102a under development, and is capable of holding values of any specific data that the interface 602 of the software component 102a will need to provide to the interface 606 of the service of the first application 104, when the software component 102 is operated once its development is completed, and any specific data the interface 606 of the service will return to the software component 102 upon completion of the performance of the service.

The automatic generation generates any computer program instructions necessary to create the data context 604 in the software component 102a. In one embodiment, the automatically generating comprises generating the data context 604 as part of at least one of: the execution controller 108 capable of requesting the service from the first application 104, or the second application 112 capable of invoking the service through the execution controller 108. For example, in an embodiment in which the software component 102a under development is the execution controller 108, the automatically generated data context is generated to hold values of the specific data that the communication interface 604 of the execution controller 108 will need to provide to the interface 606 of the service of the first application 104 when the execution controller 108 requests the service from the first application 104. Similarly, the automatically generating can also generate the data context 604 for the second application 112. For example, the second application 112 may require its own data context for invoking the service from the first application 104 through the execution controller 108. In a similar manner to the data context generation for the execution controller 108, the data context 604 generated for the second application 112 holds data values that the second application 112 uses to communicate with the execution controller 108 regarding the service. In one embodiment, the automatically generating generates individual data contexts 604 for both the execution controller 108 and the second application 112.

FIG. 6 depicts the software component 102 comprising the automatically generated data context 604. The communication interface 602 of the software component 102 is capable of providing the data contained in the data context 604 to the communication interface 606 of the first application 104 to request the service from the first application 104.

One advantage of the present invention is that it automatically generates the portion of the communication interface 602, e.g., the data context 604, in the same way for any service, and its associated interface 606, of the first application 104. This is advantageous because the first application 104 may perform a plurality of different services, each potentially having a different interface 606. For example, each interface 606 may be associated with a different number of specific data, each potentially having a different one of a plurality of different data types. Advantageously, the exact number or type of the specific data is not required to be known in advance by the method 400. This may be particularly advantageous for creating communication interfaces 602 for requesting services that are associated with a large number of specific data or for creating communication interfaces 602 for requesting a large number of different services.

In one embodiment, the data context 604 comprises at least one data field for storing the at least one specific data associated with the interface 606 of the service. The data field is capable of holding a value or instance of the specific data described by the metadata. For example, in one embodiment, the data field comprises a data field of the same type as the specific data. The value of the data field is optionally capable of being read from the data context 604 and written to the data context 604.

In one embodiment, the determining of step 402 determines a plurality of specific data associated with the interface 606 of the service, and the automatically generating comprises generating a plurality of data fields of the data context 604, wherein at least one of: the plurality of generated data fields have a one-to-one correspondence with the plurality of specific data; each of the plurality of specific data has a correspondence to at least one of the plurality of generated data fields; or each of a first portion of the plurality of specific data has a correspondence to at least one of the plurality of generated data fields, and none of a second portion of the plurality of specific data corresponds to any of the plurality of generated data fields, the second portion being a non-empty portion.

In one embodiment, the data context 604 comprises a structure which organizes the generated data fields. For example, the data context 604 optionally comprises a hierarchical structure comprising a plurality of nodes, and at least one of the plurality of nodes is associated with the at least one data field. In one embodiment, a plurality of the nodes are associated with a plurality of the automatically generated data fields. The nodes of the hierarchical structure can be used to organize the data within the data context 604. In one embodiment, a plurality of nodes can optionally be separate instances of a particular specific data. For example, if the specific data is a customer order object, a plurality of nodes may represent a plurality of customer orders.

In one embodiment, each node contains data fields which represent at least one of: an individual instance of an object data type, or a table of instances of an object data type. For example, if the specific data is a customer order, a node of the data context 604 may represent an object data type representing a shirt that the customer is ordering. The object data type can have a plurality of characteristics, such as size, color, style, etc. Similarly, a node of the data context may represent a table of instances of the shirt object, for example, in a scenario in which the customer is ordering a plurality of shirts.

In one embodiment, steps 402 and 404 of the method 400 occur during the development of the software component 102a, and not during the operation of the software component 102 once the development of the software component 102 is completed. For example, in one embodiment, the software component 102a under development includes the execution controller 108 and the second application 112, the second application 112 comprising a graphical user interface and being developed to be capable of invoking the service of the first application 104 through the execution controller 108. In one embodiment, the method 400 comprises creating at least a portion of the second application 112 and the execution controller 108, and providing to the conversion tool 204 information related to the second application 112 and the execution controller 108, the information indicating the service the second application 112 is being developed to be capable of invoking. The determining and automatically generating by the conversion tool 204 are then performed during the development of the second application 112 and the execution controller 108, but not during the operation of the second application 112 and the execution controller 108 after the development of the second application 112 and the execution controller 108 is completed. Eventually, the development of the second application 112 and the execution controller 108 is completed, and may be put into operation.

In one embodiment, the method 400 further comprises using the software component 102 once the development is completed. For example, in one embodiment, the method 400 comprises automatically generating the data context 604 such that the data context 604 is capable of being used by the execution controller 108 for communicating data between the first application 104 and the second application 113, and then eventually using the data context 604 by the execution controller 108 for exchanging data with the first application 104 and the second application 112, the first application 104 and the second application 112 writing data to the data context 604 through the execution controller 108, and the first application 104 and the second application 112 reading data from the data context 604 through the execution controller 108. In one embodiment, the method 400 comprises automatically generating the data context 604 such that the data context 604 is capable of being used by the execution controller 108 during a request of the service from the first application 112, and then eventually using the data context 604 by the execution controller 108 for requesting the service from the first application 112, wherein the execution controller 108 provides data stored in the data context 604 to the interface 606 of the service.

In one embodiment, the generated data context 604 is associated with the execution controller 108, and a second data context 604 is associated with the second application 112, wherein the automatically generated data context 604 comprises the hierarchical data storage structure having at least one node associated with the at least one data field, and the second data context 604 comprises a second hierarchical data storage structure having at least one second node associated with the at least one second data field. In one such embodiment, the method 400 further comprises linking the value stored in the at least one data field associated with the at least one node of the generated data context 604 to the valued stored in the at least one second data field associated with the at least one second node of the second data context 604.

The embodiment of the method depicted in FIG. 5 further comprises a step 502 in which the software component 102a under construction reaches the stage of development at which it requires a service to be implemented. The embodiment of FIG. 5 also includes the optional step 508 of providing the service by the first application 104 to the conversion tool 204 during the development of the second application 112. This may be useful to the conversion tool 204 during the determining of step 402. Additionally, at step 510 the second application 112 receives the generated data context 604.

Further embodiments are also possible, which are the result of variously combining steps, elements or embodiments described herein. For example, further embodiments may comprise an altered order of the steps of the method 400 described herein, the result of which may be an embodiment particularly suited to a specific purpose or implementation. In another example, embodiments of the method 400 may include or exclude optional steps. Further embodiments, which would be discernable based on the disclosure of the present Application, are also possible.

What is claimed is:

1. A method of generating an updated graphical user interface, comprising:
   retrieving, from a database table that logs a previous execution of a predetermined database query by a first application, metadata including values of a plurality of data variables previously entered into a graphical user interface of the first application to request the execution of the database query by the first application;
   determining, from the previously entered data variable values of the retrieved metadata, identity and data type of the plurality of data variables required by the graphical user interface of the first application to request the execution of the database query by the first application;
   automatically generating program instructions of a second application in response to the determined plurality of data variables, the second application having a second graphical user interface for requesting the execution of the database query by a user, the automatically generated instructions defining elements of the second graphical user interface configured to receive the determined plurality of data variables;
   executing the generated instructions of the second application and receiving values of the plurality of data variables from the user at the second graphical user interface as part of a request for execution of the database query; and
   communicating the received values of the plurality of data variables from the second application to the first application, to request the database query from the first application without the user directly using the graphical user interface of the first application.

2. The method of claim 1, wherein the plurality of data variables represent parameters of the predetermined database query and the previously-entered values of the plurality of variables at least partially define a data set output as a result of the database query.

3. The method of claim 1, wherein the retrieving further includes retrieving the metadata from within computer program instructions of a software component.

4. A computer readable storage medium comprising computer instructions, which when executed by a processor perform a method of generating an updated graphical user interface, the method comprising:
   retrieving, from a database table that logs a previous execution of a predetermined database query by a first application, metadata including values of a plurality of data variables-previously entered into a graphical user interface of the first application to request the execution of the database query by the first application;
   determining, from the previously entered data variable values of the retrieved metadata, identity and data type of the plurality of data variables required by the graphical user interface of the first application to request the execution of the database query by the first application;
   automatically generating program instructions of a second application in response to the determined plurality of data variables, the second application having a second graphical user interface for requesting the execution of the database query by a user, the automatically generated instructions defining elements of the second graphical user interface configured to receive the determined plurality of data variables;
   executing the generated instructions of the second application and receiving values of the plurality of data variables from the user at the second graphical user interface as part of a request for execution of the database query; and
   communicating the received values of the plurality of data variables from the second application to the first application, to request the database query from the first application without the user directly using the graphical user interface of the first application.

5. The computer readable storage medium of claim 4, wherein the plurality of data variables represent parameters of the predetermined database query and the previously-entered values of the plurality of variables at least partially define a data set output as a result of the database query.

6. The computer readable storage medium of claim 4, wherein the retrieving further includes retrieving the metadata from within computer program instructions of a software component.

7. The method of claim 1, wherein the retrieving of the metadata further includes searching the database for an identifier identifying the predetermined database query, the identifier including at least one of: a name of the database query, or a command included in the database query.

8. The method of claim 1, wherein the retrieving the metadata further includes searching program instructions of the first application and reading the metadata from the program instructions of the first application.

9. The computer readable storage medium of claim 4, wherein the retrieving of the metadata further includes searching the database for an identifier identifying the predetermined database query, the identifier including at least one of: a name of the database query, or a command included in the database query.

10. The computer readable storage medium of claim 4, wherein the retrieving the metadata further includes searching program instructions of the first application and reading the metadata from the program instructions of the first application.

11. A method of generating an updated graphical user interface, comprising:
   retrieving metadata describing a plurality of data variables entered into a graphical user interface of a first application to request a service, wherein the retrieving includes automatically parsing text of and searching executable program instructions of the first application to locate the metadata in the program instructions of the first application;
   determining, from the metadata, the plurality of data variables required by the graphical user interface of the first application to request the service; and
   automatically generating program instructions of a second application having a second graphical user interface for requesting the service by a user, the automatically generated instructions defining the determined data variables for the second application, which is configured to receive the data variables from the user and request the service from the first application without the user directly using the graphical user interface of the first application;
   executing the generated instructions of the second application and receiving values of the plurality of data variables from the user at the second graphical user interface as part of a request for the service; and
   communicating the received values of the plurality of data variables from the second application to the first application, through an execution controller, to request the service from the first application.

12. A computer readable storage medium comprising program instructions, which when executed perform a method of generating an updated graphical user interface, the method comprising:
   retrieving metadata describing a plurality of data variables entered into a graphical user interface of a first application to request a service, wherein the retrieving includes automatically parsing text of and searching executable program instructions of the first application to locate the metadata in the program instructions of the first application;
   determining, from the metadata, the plurality of data variables required by the graphical user interface of the first application to request the service; and
   automatically generating program instructions of a second application having a second graphical user interface for requesting the service by a user, the automatically generated instructions defining the determined data variables for the second application, which is configured to receive the data variables from the user and request the service from the first application without the user directly using the graphical user interface of the first application;
   executing the generated instructions of the second application and receiving values of the plurality of data variables from the user at the second graphical user interface as part of a request for the service; and
   communicating the received values of the plurality of data variables from the second application to the first application, through an execution controller, to request the service from the first application.

13. A method of generating an updated graphical user interface, comprising:
   retrieving, from a database table that logs a previous execution of a predetermined database query by a first application, metadata including values of a plurality of data variables previously entered into a graphical user interface of the first application to request the execution of the database query by the first application;
   determining, from the previously entered data variable values of the retrieved metadata, identity and data type of the plurality of data variables required by the graphical user interface of the first application to request the execution of the database query by the first application; and
   automatically generating program instructions of a second application in response to the determined plurality of data variables, the second application having a second graphical user interface for requesting the execution of the database query by a user, the automatically generated instructions defining elements of the second graphical user interface configured to receive the determined plurality of data variables;
   wherein the plurality of data variables represent parameters of the database query and the previously-entered specific values of the plurality of variables at least partially define a data set output as a result of the predetermined database query.

14. A computer readable storage medium comprising program instructions, which when executed perform a method of generating an updated graphical user interface, the method comprising:
   retrieving, from a database table that logs a previous execution of a predetermined database query by a first application, metadata including values of a plurality of data variables previously entered into a graphical user interface of the first application to request the execution of the database query by the first application;
   determining, from the previously entered data variable values of the retrieved metadata, identity and data type of the plurality of data variables required by the graphical user interface of the first application to request the execution of the database query by the first application; and
   automatically generating program instructions of a second application in response to the determined plurality of data variables, the second application having a second graphical user interface for requesting the execution of the database query by a user, the automatically generated instructions defining elements of the second graphical user interface configured to receive the determined plurality of data variables;

wherein the plurality of data variables represent parameters of the database query and the previously-entered specific values of the plurality of variables at least partially define a data set output as a result of the predetermined database query.

* * * * *